Patented Aug. 18, 1936

2,051,279

UNITED STATES PATENT OFFICE 2,051,279

MINERAL WOOL

John T. Thorndyke, Los Angeles, Calif., assignor of one-third to Alfred W. Knight, South Pasadena, Calif.

No Drawing. Application March 21, 1934,
Serial No. 716,675

4 Claims. (Cl. 106—36.3)

This invention relates to the manufacture of a more stable and permanent rock or mineral wool, and particularly to a mineral wool of advantageous composition and physical properties.

It is well known that mineral wool may be prepared by melting a suitable charge of raw materials and then introducing a stream of a suitable fluid such as air or steam into a stream of the molten raw material whereby the molten material is blown into threads or fibres, such threads or fibres being collected in a suitable chamber or the like, from which they are removed from time to time or continuously as the case may be. In general, the raw material from which the mineral wool is prepared is commonly termed "wool-rock" and generally consists principally of an argillaceous calcium carbonate, or the raw material may consist of a mixture of rocks or minerals containing calcium and magnesium carbonates, alumina and silica. In either case, whether a natural wool-rock or a mixture of rocks is used, a suitable fluxing agent is commonly required to facilitate the melting thereof. The most common raw material at present employed is argillaceous limestone, and in view of the fact that such limestone is not a true mineral in the sense of having a relatively fixed composition, it is very difficult to obtain a uniform product therewith due to variations in the composition of such raw material. Some mineral wool is prepared from blast furnace slag or the like, which may be of relatively uniform composition, but it is generally considered necessary to exercise careful control of the raw materials and to modify such raw materials with other reagents or fluxes to insure the production of a uniform grade of product. Furthermore, the color of the mineral wool is considered highly important in the trade, and wools which are very light-colored or substantially colorless command a premium. Where mineral wool is prepared of slag, or even from mixtures of various materials such as calcium carbonate, silica and aluminum oxides, as is sometimes done, it has been found relatively difficult if not impossible to definitely control the color of the resulting mineral wool.

In view of the above, one of the principal objects of the present invention is to provide a mineral wool which may be produced of particularly high salability as regards color and other physical properties.

A further object of the invention is to provide a mineral wool at a materially lower cost as compared with hitherto proposed mineral wools.

A further object of the invention is to provide a mineral wool which may be produced from a raw material comprising a natural mineral having a substantially unvarying chemical composition.

According to a preferred embodiment of the present invention, a mineral selected from a group of minerals mineralogically classified as pyroxenes is subjected to fusion and the mineral wool produced by blowing a stream of air or other suitable fluid into a stream of the fused raw material according to the well-known practice in mineral wool manufacture. The novelty of the present invention rests principally in the use of an advantageous raw material for the production of such mineral wool. The minerals which are mineralogically classified as pyroxenes bear the general formula $RSiO_3$ where R consists principally of calcium plus magnesium, giving rise to minerals such as diopside $CaMg(SiO_2)_2$. Other of the pyroxenes contain some iron, aluminum, manganese, zinc and like metals usually along with but sometimes in place of the calcium or magnesium above-mentioned. The pyroxenes which are suitable in the present instance are more particularly those pyroxenes which are high in calcium, and of these, the mineral Wollastonite has been found to be the most advantageous raw mineral in view of its relatively low melting point and its freedom from color, due to the absence of other metallic ions, and the following description is directed principally to the use of this particular mineral.

The mineral Wollastonite is essentially an anhydrous calcium metasilicate, $CaO.SiO_2$. This mineral is available in certain localities in relatively pure form, and until the advent of the present invention has been considered of no particular commercial importance. The advantages in the use of Wollastonite in the manufacture of mineral wool lie principally in its relatively low melting point, the substantially unvarying chemical composition of the naturally occurring mineral, and its characteristic of being relatively flexible and highly resilient when fused into a glass, whereby a mineral wool produced therefrom is not only of highly uniform composition and color due to the invariability of the raw material, but is highly desirable from the standpoint of the high mechanical strength of the individual fibres constituting the wool.

It has been found that the most desirable mineral wool product is obtained when the melted material is brought to a temperature in the vicinity of 100° C. above its true melting point. It has been recognized in the mineral wool art that the raw material should be heated to a certain desirable temperature somewhat above the actual melting point of the mixture in order to obtain the most advantageous product, but this desirable temperature has been hitherto quite difficult to decide upon, in view of the tremendous variations in the chemical constitution and hence actual melting point of the raw material. If the molten raw material is blown at a temperature not sufficiently in excess of its melting point, a relatively high percentage of non-fibrous glass is realized in the wool, which adds to its weight per cubic foot and materially detracts from its desirable characteristics, and if the temperature is raised too far beyond the melting point, the resulting fibres are found to be "off color" and relatively brittle. When a material of known and substantially constant chemical constitution is employed as a raw material for the production of mineral wool the true melting point of such material will be known and substantially constant temperature, hence it is possible to raise the temperature of the molten material to a definite point above the true melting point to obtain a finished product having the desired characteristics.

In addition to the above advantageous character of the mineral Wollastonite as a raw material for the manufacture of mineral wool, another quite advantageous feature lies in the fact that a wool which has a relatively high melting point as compared to standard wools may be prepared by melting a raw material at a somewhat lower temperature than is required for melting the raw materials hitherto employed. This seeming anomaly may be explained by the following example: If a mineral wool is to be made from a mixture of raw materials such as calcium carbonate, silica and alumina, the charge of raw material must be heated to a temperature sufficient to actually melt one of the constituents before a homogeneous melt is obtained. This requires that the charge of raw material must be heated to a temperature generally materially above the true melting point of the final glass, and the wool produced from such glass will accordingly have a melting point which is materially lower than the temperature to which the raw material was raised to effect the formation of the glass. Where a material such as Wollastonite is employed, it is only necessary to raise the temperature of the charge to a point sufficiently in excess of the true melting point thereof to obtain the desired fluidity, and the melting point of the subsequently formed wool will be no lower than the melting point of the raw material. Thus, even though the wool of the present invention may have a melting point above that of the conventional wool, the melting temperature of the raw charge may be materially lower than the melting temperature of a conventional wool charge.

The production of mineral wool according to the present invention may be carried out in the standard apparatus at present in use in the art, as exemplified by United States patents to Fay No. 1,256,541, Powell No. 1,656,828 and Miller No. 1,765,026, or as described in an article entitled "The Mineral Wool Industry in Indiana" by W. N. Logan, appearing as an American Institute of Mining and Metallurgical Engineers preprint. It has been hitherto considered proper practice to melt the wool-rock in a cupola with coke or coal used as fuel, but it will be understood that any suitable melting means may be provided, either gas-fired, coal-fired, coke-fired, or electrically heated. The principal feature of any process for producing the mineral wool lies in providing a source of molten wool-rock, and blowing a suitable fluid such as steam or air against a small stream of the molten glass, whereby the molten material is thrown into long threadlike fibres. The fibres may be allowed to settle in a long enclosed room, where the accumulated mass resembles a bank of freshly fallen snow, or may be collected in any other suitable manner, for example, on a travelling belt or conveyor, as shown in patent to Miller No. 1,765,026.

The mineral wool prepared by the use of Wollastonite is a highly superior commercial product, having a uniformly white color, being substantially free of non-fibrous contaminations, and being capable of maintaining its physical form in handling. Furthermore, a wool made from such a raw material is of a novel chemical composition as compared with the previously known forms of mineral wool. Such composition is characterized by a substantial absence of aluminum compounds, which were hitherto considered as an essential constituent of a satisfactory wool. The wool is further characterized by containing substantially equal molecular proportions of calcium oxide and silicon dioxide. The proportion of calcium oxide in the product is in general between 40 and 45% and the proportion of silicon dioxide is in general between 45 and 50%, while the proportion of calcium oxide and silicon dioxide is in general seldom less than 90 per cent of the total. The following is an example of the chemical analysis of a mineral wool prepared in this manner:

|  | Per cent |
|---|---|
| $SiO_2$ | 49.20 |
| $Fe_2O_3$ | .64 |
| $Al_2O_3$ | 2.46 |
| $CaO$ | 44.30 |
| $MgO$ | 2.62 |
| $K_2O$ | .20 |
| $Na_2O$ | .50 |
| $Mn_2O_3$ | .04 |
|  | 99.96 |

As above pointed out, the percentages of calcium and silicon oxides are generally in a substantially molecular ratio when the Wollastonite is used as the raw material, and where other pyroxenes are used this ratio preferably still maintains and is then between RO and $SiO_2$, where RO indicates (CaO), (MgO), etc., or mixtures thereof such as (CaO, MgO).

It will be appreciated that certain fluxes such as borax or the like may be incorporated in the melt, if desired, whereby the melting point of the glass is reduced, or the fluidity of the melt modified. In general, however, due to the physical properties of the present raw material, such fluxing is not considered necessary.

I claim:

1. A mineral wool prepared by fusing a high calcium mineral selected from the pyroxene mineralogical group and having a composition represented by the general formula $RSiO_3$ in which the molecular proportion of silica is substantially equal to the molecular proportion of the other metal oxide or oxides present in said mineral, and blowing a stream of such molten mineral to form fibrous strands.

2. A mineral wool prepared by fusing the natural mineral Wollastonite and blowing a stream of such molten mineral to form fibrous strands.

3. A mineral wool consisting principally of the oxides of calcium and silicon combined in substantially equi-molecular proportions.

4. A mineral wool containing in excess of 95 per cent of a chemical combination of substantially equi-molecular proportions of calcium oxide and silicon dioxide.

JOHN T. THORNDYKE.